(12) United States Patent
Kohama

(10) Patent No.: US 7,258,189 B2
(45) Date of Patent: Aug. 21, 2007

(54) SEAT BELT APPARATUS

(75) Inventor: Shigeru Kohama, Yamatokoriyama (JP)

(73) Assignee: Takata Corporation, Tokyo (JP)

( * ) Notice: Subject to any disclaimer, the term of this patent is extended or adjusted under 35 U.S.C. 154(b) by 366 days.

(21) Appl. No.: 10/979,227

(22) Filed: Nov. 3, 2004

(65) Prior Publication Data

US 2005/0098998 A1 May 12, 2005

(30) Foreign Application Priority Data

Nov. 11, 2003 (JP) ............................. 2003-380810

(51) Int. Cl.
*B60K 28/00* (2006.01)
*B60R 22/00* (2006.01)

(52) U.S. Cl. ..................... 180/268; 180/273; 280/801.1

(58) Field of Classification Search ........... 73/862.391; 180/268, 273; 280/801.1, 808; 297/250.1; 701/45
See application file for complete search history.

(56) References Cited

U.S. PATENT DOCUMENTS

| | | | |
|---|---|---|---|
| 4,256,329 A * | 3/1981 | Winnale | ..................... 280/802 |
| 4,278,043 A | 7/1981 | Heath | |
| 4,575,119 A | 3/1986 | Okuhara et al. | |
| 5,149,133 A | 9/1992 | Alvarado | |
| 5,215,332 A | 6/1993 | De Sloovere | |
| 5,431,446 A | 7/1995 | Czarnecki et al. | |
| 5,902,015 A * | 5/1999 | Allcock | ..................... 297/463.1 |
| 6,234,529 B1 | 5/2001 | Ellison et al. | |
| 6,390,562 B1 * | 5/2002 | Takamizu et al. | ........... 297/483 |
| 6,594,571 B2 * | 7/2003 | Sakai et al. | ..................... 701/45 |
| 6,889,146 B2 * | 5/2005 | Sullivan et al. | ............... 702/43 |
| 7,114,590 B2 * | 10/2006 | McFalls et al. | ............. 180/268 |
| 7,156,198 B2 * | 1/2007 | Nishide et al. | ............. 180/273 |
| 2002/0043838 A1 * | 4/2002 | Yanaka et al. | ........... 297/250.1 |
| 2003/0110869 A1 | 6/2003 | Aoki | |
| 2006/0225939 A1 * | 10/2006 | Burghardt et al. | .......... 180/268 |

FOREIGN PATENT DOCUMENTS

| | | |
|---|---|---|
| JP | 9-95204 A | 4/1997 |
| JP | 258 3612 Y2 | 8/1998 |
| JP | 2003-137011 A | 5/2003 |

* cited by examiner

*Primary Examiner*—Paul N. Dickson
*Assistant Examiner*—Laura B. Freedman
(74) *Attorney, Agent, or Firm*—Foley & Lardner LLP

(57) ABSTRACT

A seat belt apparatus includes a buckle configured to be attached to a seat frame of a vehicle seat, a seat belt including a first portion configured to be secured to a vehicle body by an anchor and a second portion having a tongue configured to engage the buckle, a first connector connecting the first and second portions of the seat belt, and a second connector disposed on the seat frame. The first and second connectors are configured to engage.

12 Claims, 3 Drawing Sheets

SEAT BELT APPARATUS

BACKGROUND OF THE INVENTION

The present invention relates to a seat belt apparatus which is installed on a seat of a vehicle such as an automobile and, in an emergency such as upon collision of vehicles, restrains and protects a passenger (including a driver) by a seat belt. More particularly, the present invention relates to a seat belt apparatus which is installed on a seat having a seat weight measuring unit for measuring the weight of the seat including the weight of the passenger on the seat of the vehicle, and in which a lap anchor to which an end of a lap belt is connected is attached to the vehicle body such as the vehicle floor or the vehicle side wall.

In a vehicle such as an automobile, a seat belt apparatus and an airbag apparatus used simultaneously therewith are provided for the purpose of protecting a passenger sitting down on a seat of the vehicle in an emergency such as upon a collision. The seat belt apparatus protects the passenger, in an emergency, by restraining the passenger at shoulder, chest, and waist. The leading end of the seat belt is connected to the lap anchor. This lap anchor is, in many cases, connected to a lap anchor attached to the vehicle body on the vehicle floor, a vehicle side wall, or a door, considering the layout of the seat belt.

When the seat belt is connected to the vehicle body by the lap anchor as described above, it is possible to prevent the seat belt from disturbing a passenger's sitting down on a vehicle seat or leaving the same. This facilitates getting on and off the vehicle and enables the vehicle to support the belt tension of the seat belt, thereby ensuring more reliable constraint of the passenger. The airbag apparatus protects the passenger by preventing the passenger from colliding with the vehicle body by inertia movement through expansion and deployment of the airbag, in an emergency, used simultaneously with the seat belt apparatus.

There are proposals to further increase the effect of a seat belt apparatus or an airbag apparatus by providing a seat weight measuring unit having load sensors arranged in front and back and to the right and the left of the space under the seat to measure the seat weight including the weight of the passenger sitting on the seat with these sensors and detect the weight of the passenger and the sitting posture of the passenger on the basis of the measured values of the seat weight, and by adjusting the pre-tension of the seat belt in response to the detected passenger weight and the passenger's sitting posture, or adjusting the amount of gas expanded and deployed of the airbag or the expanding and deploying speeds. For example, see Japanese Unexamined Patent Application Publication No. 2001-150997, incorporated by reference herein.

FIG. 3 schematically illustrates a seat belt apparatus 2a installed on a seat having a seat weight measuring unit annexed thereto, as disclosed in Japanese Unexamined Patent Application Publication No. 2001-150997 (incorporated by reference herein). In FIG. 3, reference numeral 1 represents a seat of a vehicle; 1a, a seat cushion on which the passenger sits down; 1b, a seat frame supporting the seat cushion 1a; 1c, a back against which the passenger's back leans upon sitting down on the seat cushion 1a; 2, a seat belt apparatus; 3, seat belt pair out from a retractor R not shown; 4, a lap anchor, attached to the vehicle body, to which the leading end of the seat belt 3 is connected; 5, a tongue slidably supported by the seat belt 3; 6, a buckle attached to the seat frame 1b; 7, a left seat weight measuring unit provided to the left (right in FIG. 3) relative to the passenger at a position between the seat frame 1b and the vehicle floor; and 8, a right seat weight measuring unit provided to the right (left in FIG. 3) relative to the passenger at a position between the seat frame 1b and the vehicle floor.

In such a seat belt apparatus 2a, the seat belt 3 is withdrawn from the retractor after the passenger sits on the seat cushion 1a, to engage the tongue 5 with the buckle 6, thereby causing the passenger to wear the seat belt 3. At this point in time, the weight of the passenger (body weight) is measured by the right and the left seat weight measuring units 7 and 8. In emergency such as upon collision of the vehicle, slack in the seat belt 3 is eliminated by a pretensioner. Simultaneously, a prescribed pre-tension is applied to the seat belt 3, and withdrawal of the seat belt 3 from the retractor is prevented, thereby constraining the passenger by the seat belt 3.

In this case, the upper part of the passenger's body including the shoulder and the chest is contained by the shoulder belt 3a of the seat belt on the retractor side from the tongue 5, and the lower part of the passenger's body including the waist is constrained by the lap belt 3b of the seat belt on the lap anchor 4 side from the tongue 5. Since the pre-strain applied to the seat belt 3 is adjusted in response to the measured passenger's weight, the passenger is more effectively constrained.

When the passenger being conveyed in the automobile is a baby, it is mandatory to use a child seat. In general, the child seat is firmly secured to the seat of the vehicle by the seat belt. When the child seat is thus firmly secured to the seat of the vehicle by the seat belt, a larger belt tension B is applied to the seat belt.

However, since the leading end of the set belt is attached to the vehicle body via the lap anchor, a downward force based on the belt tension B of the seat belt acts on the seat. As a result, the force based on the belt tension B is added to the measured value of the seat weight as measured by the seat weight measuring unit and exerts an influence on the latter. In this case, as disclosed in the above-mentioned Japanese Unexamined Patent Application Publication No. 2001-150997, while the left seat weight measuring unit 7 provided on the buckle 6 side is hardly affected by the force based on the belt tension B, the right seat weight measuring unit 8 on the lap anchor 4 side is easily affected by the belt tension.

Therefore, in the seat weight measuring unit disclosed in Japanese Unexamined Patent Application Publication No. 2001-150997, when securing the child seat, the seat weight is measured by doubling the measured value of the seat weight as measured by the left seat weight measuring unit 7 hardly affected by the force based on the belt tension. This ensures a high reliability of seat weight measurement for the seat weight measuring unit.

For the seat weight measuring unit disclosed in the above-mentioned Japanese Unexamined Patent Application Publication No. 2001-150997, a high reliability of seat weight measurement is ensured by adopting, as the seat weight measured value, a value obtained by doubling the measured value of the left seat weight measuring unit 7 as described above. However, since measured values are different between the right and the left seat weight measuring units 7 and 8, i.e., since the seat weights are imbalanced, the measured values of the left seat weight measuring unit 7 is actually affected considerably by the force based on the belt tension. It is therefore desirable to more reliably measure the seat weight by inhibiting the influence of the force caused by the belt tension as far as possible regarding the measured values of the right and the left seat weight measuring units 7 and 8, by achieving a more balanced state of the seat weight through reduction of the difference between the measured values of the right and the left seat weight measuring units 7 and 8 to the lowest possible level.

SUMMARY OF THE INVENTION

According to an embodiment of the present invention, a seat belt apparatus is provided. The seat belt apparatus includes a buckle configured to be attached to a seat frame of a vehicle seat, a seat belt including a first portion configured to be secured to a vehicle body by an anchor and a second portion having a tongue configured to engage the buckle, a first connector connecting the first and second portions of the seat belt, and a second connector disposed on the seat frame. The first and second connectors are configured to engage.

According to another embodiment, a vehicle including a seat belt apparatus is provided. The seat belt apparatus includes a buckle attached to a seat frame of a vehicle seat, a seat belt secured to a vehicle body by an anchor and including a tongue configured to engage the buckle, a first member disposed on the seat belt between the anchor and the tongue, and a second member disposed on the seat frame. The first and second members are configured to engage.

According to yet another embodiment, a seat belt apparatus is provided. The seat belt apparatus includes a lap anchor attached to a vehicle body on a first side of a seat of the vehicle, a seat belt from a seat belt retractor and including a leading end connected to the lap anchor, a buckle attached to a seat frame of the seat on a second side of the seat, a tongue slidably supported by the seat belt and engageable with the buckle, a seat weight measuring unit disposed between the seat frame and a floor of the vehicle body, and a device connected to at least the seat belt. The device is configured so that when a belt tension that is larger than a belt tension generated upon ordinary wearing of the seat belt by a passenger directly sitting down on the seat is applied to the seat belt, a force based on the larger belt tension is prevented from being applied to the seat weight measuring unit.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate a preferred embodiment of the invention and together with the description, serve to explain principles of the invention.

DETAILED DESCRIPTION

Figure 1A:
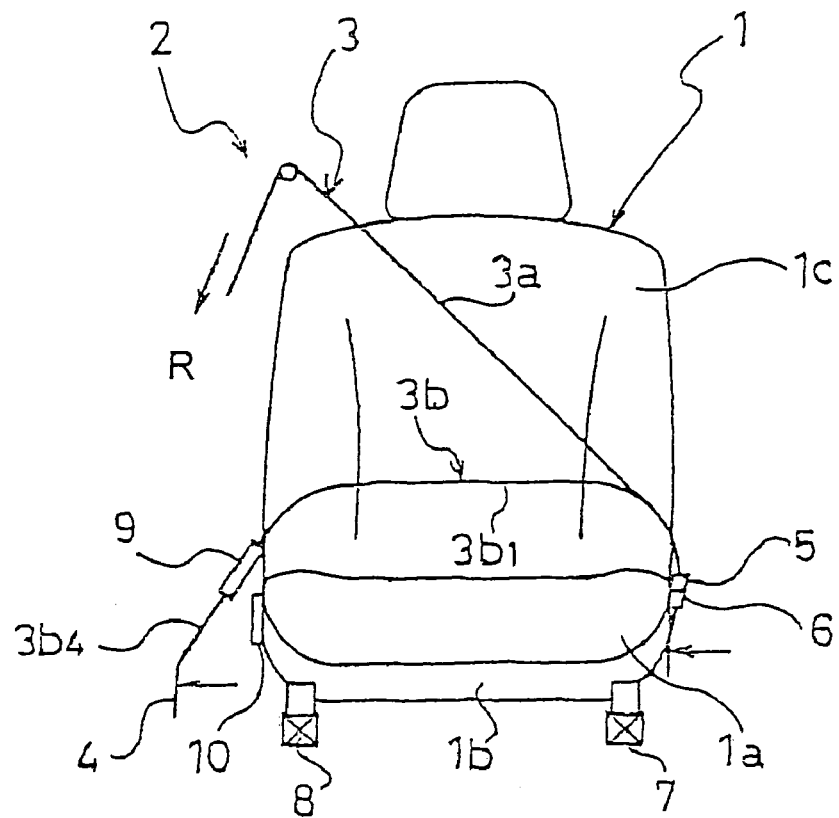
FIG. 1A is a schematic view of an embodiment of a seat belt apparatus according to the present invention showing an ordinary seat belt wearing state of a passenger.

According to an embodiment of the present invention a seat belt apparatus is provided, which, even when a large belt tension is caused for securing a fixture such as a child seat with the seat belt, permits accurate and reliable measurement of the seat weight through elimination of the effect of the belt tension.

For example, the seat belt apparatus may include at least a lap anchor attached to the vehicle body on the right or left side of the seat of the vehicle, to which a leading end of a seat belt from a seat belt retractor is connected; a buckle attached to the other side of the right or left side of a seat frame of the seat; a tongue slidably supported by the seat belt and engageable with the buckle; and a seat weight measuring unit disposed between the seat frame and the vehicle floor and which measures the weight of the seat. The seat belt apparatus may also include an imparted force preventing means which, when a belt tension, larger than the belt tension upon ordinary wearing of the seat belt by a passenger directly sitting down on the seat is applied to the seat belt, prevents a force based on this larger belt tension from being applied to the seat weight measuring unit.

Another embodiment of the present invention is similar to the previous embodiment except the imparted force preventing means includes an engaging member provided on the seat belt on the lap anchor side from the tongue and an engaged member attached to the right or left side of the seat frame. The engaging member is engageable with the engaged member. When the engaging member is engaged with the engaged member, the larger seat tension is set for the seat belt, and the larger seat tension is prevented from being transmitted by the engaging member to the seat belt on the lap anchor side. The engaging member may be, for example, an anchor holder having an engagement hole, and the engaged member may be, for example, an anchor pin which engages with the engagement hole for engagement. Furthermore, the engaging member can be formed by an engaging hole of a simple shape, and the engaged member, by means of an anchor pin of a simple shape, thereby permitting low-cost forming of the imparted force preventing means.

According to the above-described embodiments, when a belt tension larger than the belt tension upon ordinary wearing of a seat belt by a passenger sitting down directly on a seat is applied to the seat belt, it is possible to prevent the force based on this large belt tension from acting on the seat weight measuring unit under the effect of the imparted force preventing means. It is therefore possible to prevent the seat weight measuring unit from being affected by the force based on the large belt tension and to keep a more accurate measured value of the seat weight measuring unit.

Particularly, when the imparted force preventing means comprises an engaging member and an engaged member, and in an ordinary use thereof for constraining a passenger sitting down on a seat of a vehicle, the engaging member is not engaged with the engaged member. The passenger can wear the seat belt more simply in the same wearing procedure as that for a common conventional seat belt apparatus. Therefore, the belt wearing operation is not complicated or burdensome for the passenger.

In this ordinary belt wearing state, the belt tension applied onto the seat belt is very slight. Therefore, even if a downward force based on this belt tension is applied to the seat, the force to be added to the measured value of the seat weight measured by the seat weight measuring unit is small, so that the measured value of the seat weight measuring unit is almost free from the influence of this force. It is thus possible to more accurately measure the weight of the passenger (body weight) with the seat weight measuring unit.

For example, when a large fastening force is applied to secure a fixture such as a child seat, a large belt tension can be set for a seat belt on the retractor side of the engaging member by engaging the engaging member with the engaged member in a state in which the tongue engages with the buckle. As a result, a fixture such as a child seat can be firmly secured to the seat. As this large belt tension is prevented from being transmitted to the seat belt on the lap anchor side of the engaging member, it is possible to prevent the force based on the large belt tension from acting on the seat weight measuring unit. That is, the seat weight measuring unit becomes free from the influence of the force based on the belt tension, thus permitting more accurate measurement of the weight of the fixture to be secured to the seat. Particularly, when the fixture to the seat is a child seat, the weight of the baby to sit down or to be laid on the child seat can be more accurately measured.

Embodiments of the present invention will now be described with reference to the drawings.

Figure 1B:
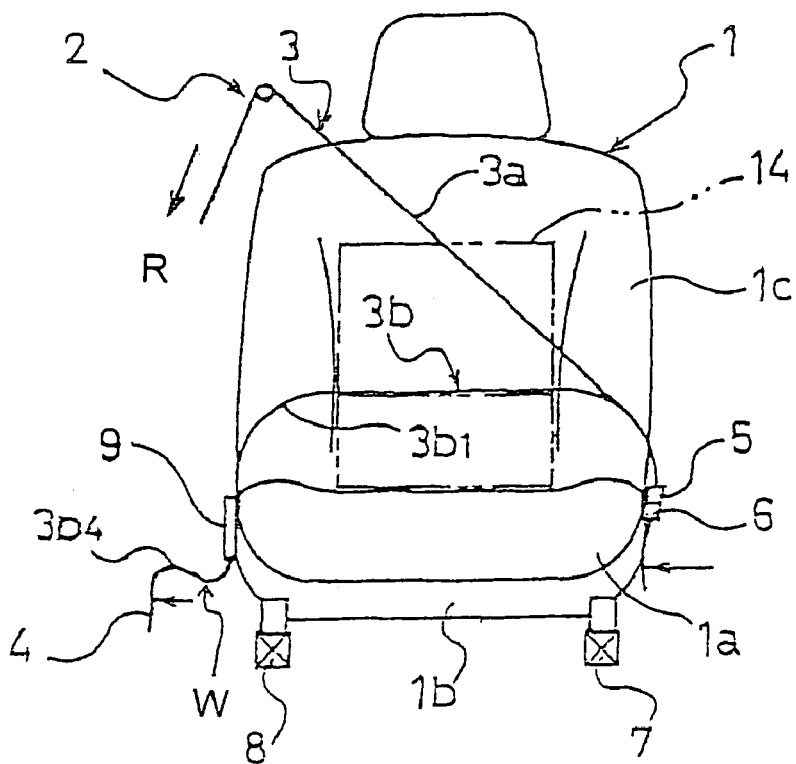
FIG. 1B is a schematic view of the seat belt apparatus of FIG. 1A showing a state in which a child seat is secured to a seat.
Figure 3:
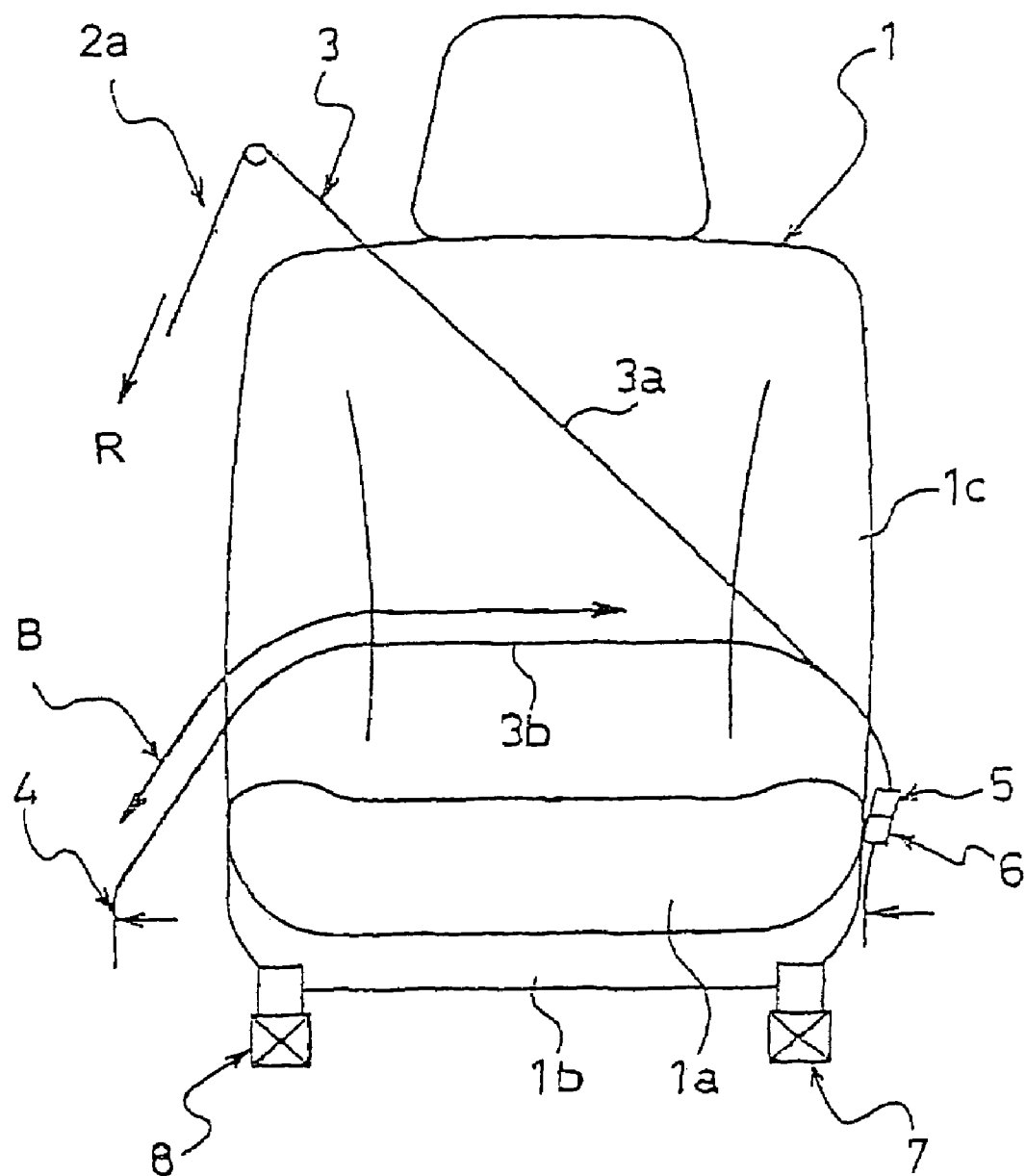
FIG. 3 is a schematic view of a conventional seat belt apparatus.

FIG. 1A schematically illustrates an embodiment of a seat belt apparatus 2 according to the present invention showing a state of an ordinary passenger wearing the seat belt. FIG. 1B illustrates the seat belt apparatus 2 of FIG. 1A in a state in which a child seat 14 is secured. Conventional components in FIGS. 1A and 1B are assigned the same reference numerals as in the conventional case shown in the above-mentioned FIG. 3, and a detailed description of these same conventional components is omitted here.

According to this embodiment, as shown in FIGS. 1A and 1B, an anchor holder 9 is provided on a part of the lap belt $3b$ closer to the lap anchor 4. An anchor pin 10 to which the anchor holder 9 can be hooked (engaged) is attached at a prescribed position on a side opposite to the buckle 6 attachment side of the seat frame $1b$.

Figures 2A, 2B:
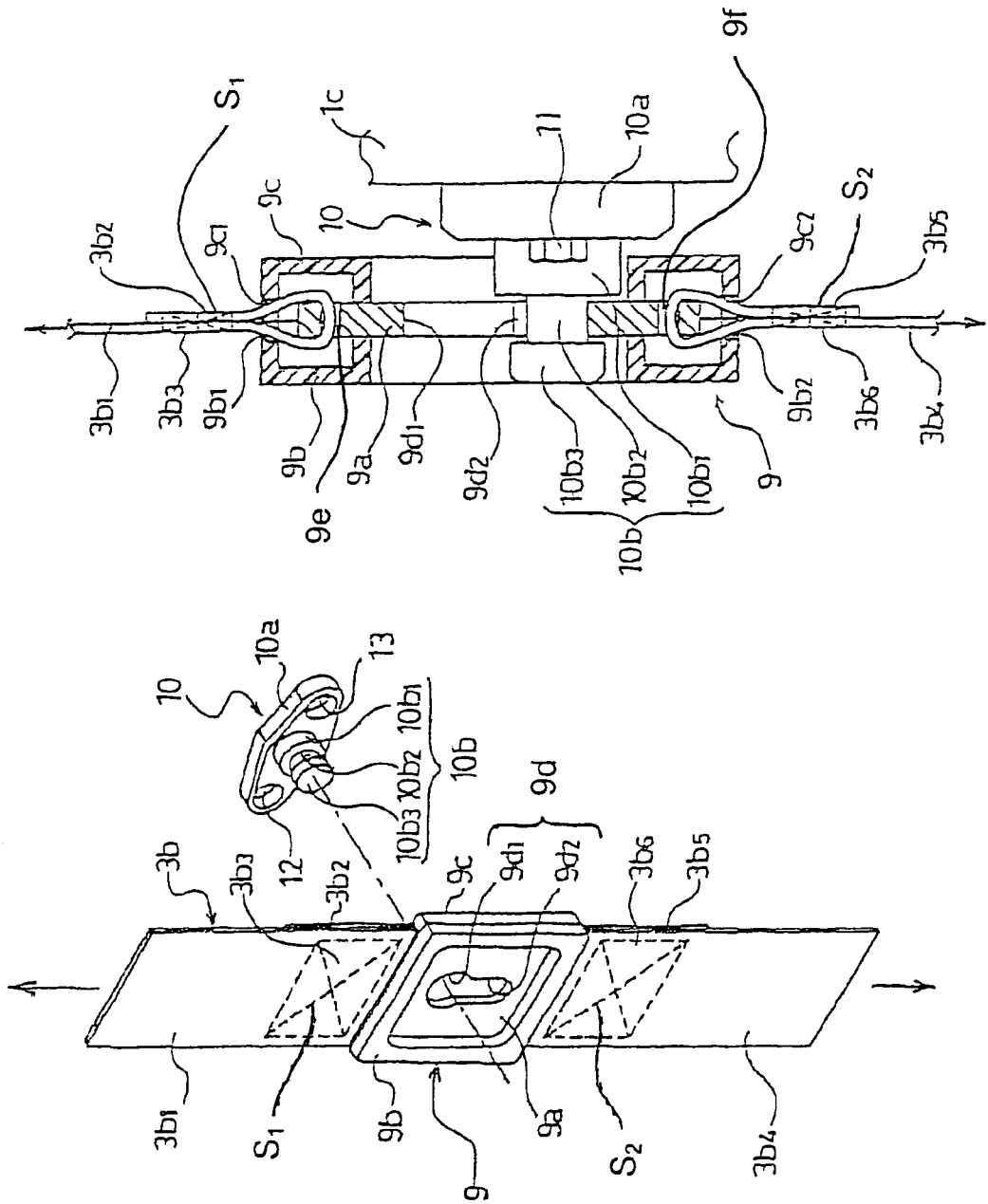
FIG. 2A is a perspective view of an anchor holder and an anchor pin according to an embodiment of the present invention.
FIG. 2B is a sectional view of the anchor holder of FIG. 2A showing an engagement state of the anchor holder and the anchor pin.

As shown in FIGS. 2A and 2B, the anchor holder 9 comprises an anchor plate $9a$ and a pair of gripping members $9b$ and $9c$ attached to the anchor plate $9a$. The anchor plate $9a$ may be, for example, a metal plate, and the gripping members $9b$, $9c$ may be, for example, made of a resin. The anchor plate $9a$ is formed into a rectangular shape, and an engagement hole $9d$ is pierced in the center portion of the anchor plate $9a$. Rectangular belt connecting holes $9e$ and $9f$ are pierced at both ends of the anchor plate $9a$, respectively. The engagement hole $9d$ may be, for example, a circular hole $9d_1$ having a relatively large diameter and a long hole $9d_2$ having a width smaller than the diameter of the circular hole $9d_1$. The circular hole $9d_1$ and the long hole $9d_2$ communicating with each other are formed integrally so that a portion of the long hole $9d_2$ of a certain width crosses (intersects) the circular hole $9d_1$.

The belt portion $3b_1$, on the tongue side of the lap belt $3b$ is inserted into the belt connecting hole $9e$ on the circular hole $9d_1$ side of the anchor plate $9a$, and then turned up. The turned-up belt portion $3b_2$ is lapped over the belt portion $3b_3$ not inserted into the belt connecting hole $9e$, and the portions $3b_2$ and $3b_3$ are sewn together at a seam $S_1$. The tongue-side belt portion $3b_1$ is thus connected to the anchor plate $9a$. The length of the tongue-side belt portion $3b_1$ should be set to a length that gives a belt tension sufficient to firmly secure the child seat 14 to the seat 1.

Similarly, the lap-anchor-side belt portion $3b_4$ of the lap belt $3b$ is inserted into a belt connecting hole $9f$ on the long hole $9d_2$ side of the anchor plate $9a$, and then turned up. The turned-up belt portion $3b_5$ is lapped over a belt portion $3b_6$ not inserted into the belt connecting hole $9f$ of the lap-anchor-side belt portion $3b_4$, and the portions $3b_5$ and $3b_6$ are sewn together at a seam $S_2$. The lap-anchor-side belt portion $3b_4$ is thus connected to the anchor plate $9a$. The length of this lap-anchor-side belt portion $3b_4$ preferably maintains a prescribed value so that the measured values of the seat weight measuring units 7 and 8 are not affected by the force based on the belt tension of the seat belt 3.

The pair of gripping members $9b$ and $9c$ may be formed into rectangular annular shapes of the same size so as to have a substantially U-shaped sectional configuration as shown in FIG. 2B. The pair of gripping members $9b$ and $9c$ may be disengageably (releasably) engaged by a clipping mechanism. The gripping members $9b$ and $9c$ are attached to the anchor plate $9a$ so as to cover the outer peripheral edge of the anchor plate $9a$ including the belt connecting portion (portion containing the belt connecting holes $9e$ and $9f$). Cavities $9b_1$ and $9b_2$ and cavities $9c_1$ and $9c_2$ are formed in the gripping members $9b$ and $9c$, respectively. In a state in which the pair of gripping members $9b$ and $9c$ are engaged with each other to form an integrated body, the cavities $9b_1/9b_2$ and $9c_1/9c_2$ form holes permitting insertion of the tongue-side belt portion $3b_1$ and the lap-anchor-side belt portion $3b_4$.

According to this embodiment, the anchor pin 10 is formed into a T shape by an attaching portion $10a$ comprising a diamond-shaped metal plate having rounded corners (R-corners) and an anchor pin $10b$ projecting from the center portion of the attaching portion $10a$. Bolt holes 12 and 13 permitting insertion of attachment bolts 11 are provided at both ends of the attaching portion $10a$. Only one attachment bolt 11 is shown in FIG. 2B.

The anchor pin $10b$ is formed into a cylindrical shape. The anchor pin $10b$ is composed of a large-diameter base $10b_1$; a small-diameter engaging portion $10b_2$ formed continuously and concentrically with this base $10b_1$; and a head $10b_3$ having a diameter smaller than that of the base $10b_1$ but larger than that of the engaging portion $10b_2$, formed continuously and concentrically with the engaging portion $10b_2$. The base $10b_1$ is set so as to have an outside diameter larger than the diameter of the circular hole $9d_1$ to prevent the base $10b_1$ from penetrating into the circular hole $9d_1$. The engaging portion $10b_2$ is set so as to have an outside diameter slightly smaller than the width of the long hole $9d_2$ to enable the engaging portion $10b_2$ to penetrate into the long hole $9d_2$. The head $10b_3$ is set to have an outside diameter smaller than the diameter of the circular hole $9d_1$ but larger than the width of the long hole $9d_2$ so as to be penetrable into the circular hole $9d_1$ and not penetrable into the long hole $9d_2$.

As shown in FIG. 2B, the attaching portion $10a$ of the anchor pin 10 is connected to the seat frame $1b$. For example, the attaching portion $10a$ of the anchor pin 10 may be applied to the side of the seat frame $1b$ so that the attaching bolts 11 penetrate into the pair of bolt holes 12 and 13, respectively. The attaching bolts 11 may be screw-connected to female screws (not shown) formed on the anchor pin 10, thus ensuring firm attachment to the seat frame $1b$.

When the anchor pin 10 is firmly attached to the seat frame $1b$, the anchor holder 9 can be hooked (engaged) on the anchor pin 10. When hooking the anchor holder 9 on the anchor pin 10, the circular hole $9d_1$ of the anchor holder 9 is first engaged with the head $10b_3$ of the anchor pin 10 while holding the gripping members $9b$ and $9c$ of the anchor holder 9. The circular hole $9d_1$ is caused to pass over the head $10b_3$ to position the circular hole $9d_1$ at the engagement portion $10b_2$ of the anchor pin 10. At this moment, even if it is tried to cause the anchor holder 9 to pass through the engagement portion $10b_2$, the circular hole $9d_1$ comes into contact with the base $10b_1$, thus preventing the anchor holder 9 from passing through the engagement portion $10b_2$. Then, when the anchor holder 9 is moved upward (i.e., moved in a direction toward the tongue-side belt portion $3b_1$), the engagement portion $10b_2$ penetrates into the long hole $9d_2$ as shown in FIG. 2B and comes into contact with the bottom of the long hole $9d_2$. Therefore, in a state in which the engagement portion $10b_2$ penetrates into the long hole $9d_2$, even if the anchor holder 9 moves toward the head $10b_3$ in the axial direction of the anchor pin $10b$ portion (to the left in FIG. 2B), and is about to come off the anchor pin 10, the long hole $9d_2$ contacting against the head $10b_3$ prevents the anchor holder 9 from escaping from the anchor pin 10.

When unhooking (disengaging) the anchor holder 9 from the anchor pin 10, from a state (shown in FIG. 2B) in which the anchor holder 9 is hooked on the anchor pin 10, the anchor holder 9 is moved downward (i.e., moved in a direction toward the lap-anchor-side belt portion $3b_4$) while holding the gripping members $9b$ and $9c$ of the anchor holder 9. By this movement, the circular hole $9d_1$ of the anchor holder 9 is set at a position opposite to the head $10b_3$. When the anchor holder 9 is moved toward the head $10b_3$ in the axial direction of the anchor pin $10b$ in this state, the head $10b_3$ goes through the circular hole $9d_1$. The anchor holder 9 thus escapes from the anchor pin 10 thereby releasing hooking.

Operation of the thus configured seat belt apparatus 2 of this embodiment will now be described.

In an ordinary case for constraining a passenger sitting down on the seat 1, the anchor holder 9 is not hooked on the anchor pin 10 as shown in FIG. 1A. In the same manner as in a usual conventional seat belt apparatus, the seat belt 3 is withdrawn from the retractor, and the tongue 5 is engaged with the buckle 6. The seat belt 3 withdrawn in excess is retracted onto the retractor, and the passenger wears the seat belt 3 in a state in which it fits the passenger's body without causing a feeling of oppression. At this moment, the belt tension applied to the seat belt 3 is very slight, so that, even if a downward force based on this belt tension acts on the seat, the force based on the belt tension is not added to the measured values of the right and left seat weight measuring units 7 and 8, and the measured values are almost free from the influence of this force.

Therefore, both the left and the right seat weight measuring units 7 and 8 can now measure the weight of the passenger (body weight) more accurately. In addition, even when the anchor holder 9 is provided on the lap belt $3b$ as described above, and simultaneously, the anchor pin 10 is provided on the seat 1, a passenger (for example, an adult) sitting directly on the seat 1 can wear the seat belt 3 in the same wearing procedure as in the conventionally known seat belt apparatus. The passenger never feels complicatedness in the wearing operation.

When the seat belt apparatus is used with a large fastening force for securing a child seat 14 to the seat 1, the anchor holder 9 may be hooked on the anchor pin 10 as shown in FIG. 1B. More specifically, the child seat 14 is placed at a prescribed position of the seat cushion $1a$ of the seat 1, and the back of the child seat 14 is brought into contact with the back $1c$ of the seat 1. In a state in which the anchor holder 9 is not hooked on the anchor pin 10, the seat belt 3 is withdrawn from the retractor, and the tongue 5 is engaged with the buckle 6. At this point in time, the seat belt 3 is engaged with the belt engagement section provided on the child seat 14 for securing the child seat 14. The seat belt 3 withdrawn in excess is retracted onto the retractor. The anchor holder 9 is not yet hooked on the anchor pin 10, and, in this state, the bottom of the long hole $9d_2$ of the anchor holder 9 is above the outer peripheral lower surface of the engagement portion $10b_2$ of the anchor pin 10 by a prescribed amount.

Then, when the anchor holder 9 is suddenly and strongly pulled down while holding the gripping members $9b$ and $9c$, the webbing sensor (since this is well known, the detailed description is omitted) of the retractor acts to prevent withdrawal of the seat belt 3. Then, as the seat tension becomes larger for the seat belt 3 on the retractor side of the anchor holder 9, the downward force based on this belt tension becomes larger. This downward force acts on the seat cushion $1a$ via the child seat 14, causing an elastic deformation of the seat cushion $1a$. This causes the circular hole $9d_1$ of the anchor holder 9 to displace to a position opposite to the head $10b_3$. The circular hole $9d_1$ may then be engaged with the head $10b_3$ and moved over the head $10b_3$ so that the circular hole $9d_1$ is placed at the engagement portion $10b_2$.

Thereafter, when the gripping members $9b$ and $9c$ are released, the gripping members $9b$ and $9c$ move upward under the effect of elastic restoring force of the seat cushion $1a$ and the like. Then, as shown in FIG. 2B, the long hole $9d_2$ engages with the engagement portion $10b_2$ (i.e., the engagement portion $10b_2$ penetrates into the long hole $9d_2$). The bottom of the long hole $9d_2$ comes into contact with the engagement portion $10b_2$, and the anchor holder 9 is hooked on the holder pin 10. As a result, the child seat 14 is firmly secured to the seat 1 by the seat belt 3.

In the state in which the anchor holder 9 is hooked on the holder pin 10, the anchor-side belt portion $3b_4$ is slackened because the anchor holder 9 has moved downward from the position where the seat belt 3 withdrawn in excess after engagement of the tongue 5 with the buckle 6 has been retracted onto the retractor. The slackened portion W is shown in FIG. 1B. As a result of the existence of the slackened portion W of the anchor-side belt portion $3b_4$, no belt tension occurs in this anchor-side belt portion $3b_4$. Therefore, the downward force based on the large belt tension of the seat belt 3 on the retractor side from the anchor holder 9 does not exert an influence on the seat weight measuring units 7 and 8. That is, the seat weight measuring units 7 and 8 become free from the effect of the force based on the belt tension and can measure more accurately the weight of the baby sitting or laid on the child seat 14.

Thus, when using the seat belt 3 in an ordinary manner, the anchor holder 9 is not engaged with the anchor pin 10. In this case, the belt tension applied to the seat belt 3 is so slight that measured values of the seat weight measuring units 7 and 8 are almost free from the influence of the force based on the belt tension. When securing a child seat 14 to the seat, the anchor holder 9 is engaged with the anchor pin 10. As a result, the child seat 14 can be firmly secured to the seat 1, and the belt tension can be prevented from being transmitted to the lap-anchor-side seat belt 3 portion from the anchor holder 9. Thus, the seat weight measuring units 7 and 8 are free from the effect of the force based on the belt tension.

In order to detach the child seat 14 secured to the seat 1 from the seat 1, the tongue 5 is removed from the buckle 6 by operating an operating button (not shown) of the buckle 6. This causes loosening of the seat belt 3 on the retractor side from the anchor holder 9. The webbing sensor of the retractor cancels operation, and the seat belt 3 is retracted onto the retractor. When the anchor holder 9 is pushed down and removed from the holder pin 10 as described above, the seat belt 3 is further completely retracted onto the retractor. Thus, the seat belt apparatus 1 becomes non-operative, and the child seat 14 is removed from the seat 1. Prior to removing the tongue 5 from the buckle 6, the anchor holder 9 may be pushed down and removed from the holder pin 10, and then, the tongue 5 may be removed from the buckle 6. In this case, however, the force required for pushing down the anchor holder 9 is larger.

In the seat belt apparatus of this embodiment, the engagement holes comprising the circular hole $9d_1$ and the long hole $9d_2$ of the anchor holder 9 can be formed into a relatively simple shape, and the holder pin 10 can be formed into a simple shape. It is therefore possible to form these components at a lower cost.

In the seat belt apparatus 2 of the above-mentioned embodiment, use of a webbing sensor operating upon sudden withdrawal of the seat belt 3 has been described when securing the child seat 14 to the seat 1. However, the automatic locking retractor (ALR) function of an emergency locking type seat belt retractor (ELR) having an ALR function as is well known may be used. In this case, upon securing the child seat 14 to the seat 1, the tongue 5 is engaged with the buckle 6 and the anchor holder 9 is engaged with the holder pin 10. Then, the child seat 14 is fastened by strongly pulling the seat belt 3. The slackened portion formed by pulling the seat belt 3 is retracted by the ELR, and the seat belt 3 may be prevented from being withdrawn by the ALR function.

In the above-mentioned embodiment, the anchor holder 9 is immovably provided relative to the lap belt 3*b*. However, the present invention is not limited to such a configuration According to another embodiment, the anchor holder 9 may be movable relative to the lap belt 3*b*. In this case, it is necessary to provide a locking mechanism that releasably locks (fixes) the anchor holder 9 to the lap belt 3*b*. The locking mechanism fixes the anchor holder 9 to the lap belt 3*b* by a fixing force set to be a large force which does not permit movement of the anchor holder 9 relative to the lap belt 3*b* when the anchor holder 9 is locked on the holder pin 10 in a state in which a large belt tension is applied to the seat belt 3 as in the case of securing the above-mentioned child seat 14. It is possible to adjust the position of the anchor holder 9, as described above, by making the anchor holder 9 movable relative to the. lap belt 3*b*.

In the above-mentioned embodiments, the shape of the anchor holder 9, the shape of the holder pin 10, and the shape of the hooking section of the anchor holder 9 and the holder pin 10 may be arbitrarily selected so long as wearing of the seat belt 3 by the passenger sitting directly on the seat is not disturbed (not a shape making it difficult to wear).

In an alternative embodiment, the anchor holder 9 may be hooked on the engaged member on the seat 1 side by a magnet in place of hooking of the anchor holder 9 on the holder pin 10.

It is also possible to provide detecting means such as a switch detecting hooking of the anchor holder 9 on the engaged member, and to make it possible to reliably know hooking and unhooking by means of hooking detection signal from this detecting means.

Although the above-mentioned embodiments are described for a case where a child seat 14 is secured by the seat belt 3 to the seat 1, the seat belt apparatus of the present invention is not limited to securing a child seat. It is also possible to secure a fixture other than a child seat 14 by the seat belt 3 to the seat 1. Also in this case, the weight of the fixture can be accurately measured.

The seat belt apparatus of the present invention may be mounted on a vehicle such as an automobile, and can be suitably used as a seat belt apparatus for protecting a passenger.

According to embodiments of the present invention, a seat belt apparatus is provided to permit more accurate measurement of the seat weight by eliminating the influence of the belt tension even upon occurrence of a larger belt tension for securing a fixture such as a child seat by the seat belt.

The priority document, Japanese Patent Application No. 2003-380810, filed Nov. 11, 2003, is hereby incorporated by reference.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt apparatus, comprising:
   a buckle configured to be attached to a seat frame of a vehicle seat;
   a seat belt including a first portion configured to be secured to a vehicle body by an anchor and a second portion having a tongue configured to engage the buckle;
   a first connector connecting the first and second portions of the seat belt; and
   a second connector disposed on the seat frame,
   wherein the first and second connectors are configured to engage so that a force generated by a belt tension of the seat belt is substantially prevented from being transferred to a seat weight measuring unit disposed between the seat frame and the vehicle body.

2. The seat belt apparatus of claim 1, wherein the first connector includes an aperture and the second connector includes a projection configured to be received in the aperture.

3. The seat belt apparatus of claim 2, wherein the aperture includes a circular portion and an elongated portion intersecting the circular portion and having a width that is less than a diameter of the circular portion.

4. The seat belt apparatus of claim 3, wherein the projection includes a head, a base, and a central portion disposed between the head and the base.

5. The seat belt apparatus of claim 4, wherein a diameter of the head is less than the diameter of the circular portion of the aperture and greater than the width of the elongated portion of the aperture.

6. The seat belt apparatus of claim 4, wherein a diameter of the base is greater than the diameter of the circular portion of the aperture.

7. The seat belt apparatus of claim 4, wherein a diameter of the central portion is less than the width of the elongated portion of the aperture.

8. The seat belt apparatus of claim 1, wherein the first portion of the seat belt is isolated from the second portion of the seat belt by the first connector.

9. A seat belt apparatus, comprising:
   a lap anchor attached to a vehicle body on a first side of a seat of the vehicle;

a seat belt from a seat belt retractor and including a leading end connected to the lap anchor;

a buckle attached to a seat frame of the seat on a second side of the seat;

a tongue slidably supported by the seat belt and engageable with the buckle;

a seat weight measuring unit disposed between the seat frame and a floor of the vehicle body; and a force prevention device connected to the seat belt and configured to prevent a belt tension larger than a belt tension generated upon ordinary wearing of the seat belt by a passenger directly sitting down on the seat from being applied to the seat weight measuring unit.

10. The seat belt apparatus of claim 9, wherein the device includes a first member disposed on the seat belt on a lap anchor side of the seat belt from the tongue and a second member attached to the seat frame on the first side of the seat, wherein the first and second members are engageable.

11. The seat belt apparatus of claim 10, wherein the first and second members are configured to engage so that when the first member is engaged with the second member, the larger belt tension is prevented from being transmitted by the first member to the seat belt on a lap anchor side of the first member.

12. The seat belt apparatus of claim 10, wherein the first member includes a holder having an engagement hole and the second member includes a pin configured to engage with the engagement hole.

\* \* \* \* \*